United States Patent [19]

Scheer et al.

[11] Patent Number: 4,980,235

[45] Date of Patent: Dec. 25, 1990

[54] PROCESS FOR PREPARING NON-POROUS MEMBRANE LAYERS

[75] Inventors: Albert V. D. Scheer, Sittingbourne, United Kingdom; Thijme Last, Amsterdam, Netherlands

[73] Assignee: Shell Oil Company, Houston, Tex.

[21] Appl. No.: 321,596

[22] Filed: Mar. 10, 1989

[30] Foreign Application Priority Data

Mar. 14, 1988 [GB] United Kingdom ................. 8805992

[51] Int. Cl.$^5$ .......................... B32B 27/00; B05D 3/06
[52] U.S. Cl. ...................... 428/421; 427/38; 427/40; 427/41; 427/243; 427/244; 427/245; 427/247; 427/407.1; 427/407.2; 427/409; 427/421
[58] Field of Search ...................... 427/38, 40, 41, 243, 427/244, 245, 247, 407.1, 407.2, 409, 421; 428/306.6, 308.4, 311.1, 318.4, 319.3, 319.9, 409, 421, 426, 429, 473.5, 500, 515, 516, 517, 689

[56] References Cited

U.S. PATENT DOCUMENTS

| 2,966,235 | 12/1960 | Kammermeyer | 183/115 |
| 3,440,264 | 4/1969 | McVannel | 260/448.2 |
| 4,009,308 | 2/1977 | Tadashi et al. | 427/294 |
| 4,230,463 | 10/1980 | Henis et al. | 55/16 |
| 4,230,468 | 10/1980 | Henis et al. | 55/16 |
| 4,358,378 | 11/1982 | Ihama et al. | 427/246 |
| 4,533,369 | 8/1985 | Okita | 55/158 |
| 4,759,776 | 7/1988 | Langsam et al. | 55/16 |
| 4,832,713 | 5/1989 | Yamado et al. | 264/41 |

FOREIGN PATENT DOCUMENTS

| 0021422 | 1/1981 | European Pat. Off. . |
| 0107636 | 6/1984 | European Pat. Off. . |
| 0004203 | of 1982 | Japan . |
| 0101226 | of 1986 | Japan . |

Primary Examiner—Stanley Silverman

[57] ABSTRACT

The invention relates to a process for preparing non-porous membrane layers by applying a solution comprising a solvent and a (e.g. silicon-containing) polymer having a weight-average molecular weight of at least 300,000 Da onto a porous substrate(e.g. polypropylene) and allowing the solvent to evaporate.

11 Claims, No Drawings

PROCESS FOR PREPARING NON-POROUS MEMBRANE LAYERS

BACKGROUND OF THE INVENTION

The invention relates to a process for preparing non-porous membrane layers. Many processes are known for the preparation of membrane layers such as solvent spreading, dip-coating, plasma polymerization and spraying of membrane-forming compounds on porous or non-porous substrates.

A problem which arises when porous substrates are to be coated with a non-porous i.e. dense membrane layer in order to produce pinhole-free composite membranes is the preparation of a non-porous layer with sufficient strength to bridge the pores in the substrate without blocking them, i.e. without substantial penetration of the non-porous layer into the pores. Blocked substrate pores would result in an undesirable decrease in permeability of the composite membranes for the fluid compounds which have to be separated, whereas the presence of substrate pores which are not covered by the non-porous membrane which would result in undesired transfer of fluid compounds through the composite membrane i.e. a decrease in selectivity.

SUMMARY OF THE INVENTION

Surprisingly, it has now been found that these problems can be overcome by applying a solution of a polymer having a weight-average molecular weight of at least 300,000 Da. onto a porous substrate and allowing the solvent to evaporate, resulting in non-porous membrane layers which are excellently suitable for fluid separation. The invention therefore relates to a process for preparing non-porous membrane layers which comprises following the aforementioned procedure and to membranes made therey.

DETAILED DESCRIPTION OF THE INVENTION

Preferably the weight-average molecular weight of the polymer(s) applied in the process according to the invention is substantially between $3 \times 10^5$ and $10 \times 10^6$ Da. Application of polymers having a molecular weight substantially below $3 \times 10^5$ Da results in the formation of membrane layers which exhibit a relatively low selectivity for the separation of components from fluid mixtures due to the presence of small openings ("pinholes") in such layers. In some cases it will be possible to close the remaining openings in a membrane layer by applying an additional coating of the polymer solution. However, the thickness of the resulting non-porous membrane layer will then become so great that the permeability for a fluid permeate compound will decrease to unacceptably low levels.

The thickness of the non-porous membrane layer prepared by means of the present process is preferably from 0.05 to 100 $\mu$m (i.e. $5 \times 10^{-8}$ to $10^{-4}$ m), and in particular from 0.1 to 10 $\mu$m, in order to have sufficient permeability for at least one compound to be separated from a fluid mixture by permeation through the membrane layer, while still possessing sufficient strength to bridge the pores of the porous substrate, as discussed hereinbefore. Spray-coating is a preferred method employed to apply the non-porous membrane layer onto the substrate because the resulting membrane layer has a substantially constant thickness. In some cases, such as the manufacture of coated hollow fibre membranes, dip-coating of the porous fibres with a polymer solution is a suitable alternative to spray-coating.

The pores in the porous substrate should be relatively small for allowing support of thin films but should on the other hand be sufficiently large as not to increase flow resistance upon the passage of permeate. In a preferred embodiment of the process according to the invention a porous substrate which contains pores having a diameter from 0.01 $\mu$m to 10 $\mu$m, and in particular from 0.01 to 5 $\mu$m, is spray-coated with the polymer containing solution. The surface porosity of the porous substrate should preferably be chosen such that the permeate throughput through said substrate at least equals the permeate throughput of the non-porous layer formed by spraying. Alternatively, a porous substrate may be chosen so that the porosity is sufficiently low to ensure that the permeate throughput for the substrate is not significantly altered by application of the non-porous membrane layer. In particular, said substrate can be of a composite nature when the layer serving as substrate for the non-porous layer has been obtained by plasma polymerization.

The porous substrate may be formed from any suitable material and may have any suitable shape. A porous polymer e.g. polyalkylene film can be suitably used for serving as a porous substrate for the non-porous membrane layer; porous polyimide, and in particular porous polypropylene, are preferred substrates.

It is also possible to use various porous inorganic materials as substrate for the process and membranes according to the invention. Suitably, the materials applied are of a ceramic nature, either crystalline or substantially amorphous, in particular alumina, silica, porous glass or quartz. These substrates may be flat or tubular. Tubular-, and in particular capillary, membranes can withstand relatively high pressure differences between their inner- and outer-walls for a given wall thickness and are therefore sometimes preferred over flat membranes.

In the solution employed in the process according to the invention a homopolymer, a copolymer or a miscible mixture of polymers may be present. Preferably, at least one of the polymers contains silicon, in particular a polysiloxane, a polysilazane and/or a fluoro silicon elastomer. Copolymers of siloxanes and polycarbonates may also be applied.

The concentration of the polymer in the solution employed in the present process is suitably from 0.1 to 10% by weight, and in particular from 0.5 to 5% by weight (w). A polymer concentration of less than 0.1% w appears to result in the formation of pinholes in the membrane layers prepared with such a solution, whereas it is in many cases not feasible to spray solutions containing more than 10% by weight of polymer. With solutions containing less than 0.5% w it appears that the porous substrate has to be sprayed a substantial number (e.g. 5–10×) of times with the solution in order to prepare a non-porous membrane layer, whereas only 1–4 spraying runs are generally required when a solution containing from 0.5–5% w polymer is used.

In order to prepare non-porous (i.e. substantially pin-hole free) membranes it is preferred to employ spraying solutions having a viscosity of at least 0.8 cP, and in particular at least 1.0 cP. An advantage of employing solutions having a relatively high viscosity of e.g. up to 10 cP is that less spraying runs are usually required to prepare non-porous membrane layers than when solutions with a viscosity of less than 1.0 cP are employed.

Spraying solutions containing a polymer having the appropriate molecular weight can be suitably prepared by employing a (in some cases commercially obtainable) pre-polymer having a molecular weight lower than 300,000 Da and adding a curing system thereto, e.g. at elevated temperature. By quenching the resulting mixture (e.g. by adding an appropriate solvent at ambient or lower temperature) a solution of a polymer having the molecular weight (range) required for the process according to the invention can be obtained. Subsequently, the solution thus obtained is preferably further diluted with solvent if the polymer concentration is still higher than desired.

The solvent applied in the process according to the invention preferably has a boiling point which is neither too low (i.e. close to the temperature at which the present process is to be carried out) nor too high (which would result in undesirably extruded solidification times for the non porous membrane layers thus prepared). Furthermore, the type of solvent applied in the present process depends on the choice of polymer(s). Suitable solvents include normally liquid alkanes such as pentane, cyclohexane, and in particular 2,2,4-trimethyl pentane (isooctane); aliphatic alcohols such as methanol, ethanol and higher alcohols, halogenated alkanes, aldehydes, ketones, ethers and esters such as methyl acetate. In some cases it is also envisaged to employ aromatic solvents such as benzene, toluene or xylenes, or heterocyclic solvents such as tetrahydrofuran.

In a further preferred embodiment of the process according to the invention the non-porous membrane layer is treated with a plasma or coated by means of plasma polymerization with a non-porous selective membrane layer in order to further improve the selectivity of the composite membranes thus obtained when applied in molecular separation processes. Plasmas are suitably generated in an enclosed space in which a pressure substantially below 0.1 bar is maintained e.g. by means of a vacuum pump, by transferring energy (e.g. thermal or electromagnetic) to a gas contained in the enclosed space and thereby producing reactive particles such as electrons, ions, radicals, molecular fragments and atoms in the ground state or in an excited state.

A number of different plasma generation means can be employed in the present process such as direct current arc-, ion beam-, radio frequency (r.f.)- and microwave-plasma generation means. The ion beam generation method is regarded as less suitable for the present purpose than r.f. and microwave plasma generation due to the limited efficiency of the production of reactive plasma particles using the ion beam method. Plasma is preferably generated in an electrodeless plasma generation zone (in order to avoid contamination of the hydrocarbonaceous membrane-forming compound(s) with electrode material) by means of capacitive or inductive coupling.

Plasma treating of the non-porous membrane layers prepared by spray-coating is preferably carried out in the presence of a non-polymerizable plasma-forming fluid e.g. an inorganic gas such as nitrogen, oxygen, hydrogen, ammonia and/or carbon dioxide, and in particular an inert gas; more preferably, said fluid contains at least one element from Group O of the Periodic Table of the Elements, in particular argon. Mixtures of argon with hydrogen and/or helium can be also suitably used as a plasma-forming fluid. Reference is made to the Periodic Table of the Elements as given in the Handbook of Chemistry and Physics, 55th edition (1975), CRC Press, Ohio, U.S.A.

Silicon present in the non-porous membrane layer formed by spraying appears to interact with the selective layer formed by plasma polymerization, resulting in the presence of silicon in said selective layer and excellent bonding of the two layers. Moreover, the presence of silicon in the non-porous and selective membrane layers appears to influence gas transport therethrough.

The presence of a non-porous membrane layer interposed between a porous substrate and a non-porous selective top layer allows the whole area of that layer to be effectively used for fluid separation, despite the presence of the porous substrate of which the pores are still open (due to the present spray-coating process). The result of the combination of a sprayed layer of a particular polymer and a selective top layer is a higher permeation rate than obtainable with similar porous substrates and top layers without the sprayed layer. The selective top layer of plasma polymerizate preferably has a thickness of less than 0.1 $\mu$m in order to keep the permeability through said layer at an acceptable level.

The choice of a hydrocarbonaceous compound which is to be employed for the plasma coating is an important factor for attaining the desired properties of the selective membrane layers thus prepared. The hydrocarbonaceous compound(s) suitably comprises a monomeric organic compound of an ionizable nature such as aromatics, organosilanes, olefins, alkylene oxides, (halogenated) lower hydrocarbons and (acrylo) nitriles. Said hydrocarbonaceous compounds preferably comprise at least one aromatic monomer, in particular toluene.

The invention furthermore relates to membranes containing a membrane layer prepared according to a process as described hereinbefore. The following Example illustrates the invention.

EXAMPLE

A pre-polymer solution comprising polydimethyl siloxane (PDMS) having a weight-average molecular weight of about 130,000 Da in 2,2,4-trimethyl pentane (45% by weight PDMS on total weight) was subjected to controlled curing at a temperture of 50° C. employing an acetoxy curing system. The polymerization was stopped by quenching the solution in 2,2,4-trimethylpentane having a temperature of 20° C. thus forming a spraying solution containing 1% by weight of pre-polymerized PDMS having a weight-average molecular weight of $3.5 \times 10^5$ Da.

The polymer spraying solution thus obtained was sprayed with a Wagner automatic spray gun (type A 100 AC) in which the dispersion of the liquid is effected by pressure atomization. As substrate carrier a cylinder rotating at 650 rpm was used along which the spray gun was moved parallel to the axis of the cylinder at a linear velocity. By spraying the polymer spraying solution at least two times (two runs along the axis of the cylinder) onto a porous polypropylene sheet (having a pore size of 0.02–0.2 $\mu$m) attached to the rotating cylinder, a composite membrane was obtained.

A permeability test of the composite membrane showed a P/l-value for carbon dioxide of 75 $Nm^3.m^{-2}.day^{-1}.bar^{-1}$. The selectivity for the separation of carbon dioxide and nitrogen (calculated as the ratio of the P/l-values for carbon dioxide and nitrogen)

was 10.5, indicating that the polydimethyl siloxane membrane layer was indeed non-porous.

COMPARATIVE EXAMPLE

A composite membrane was obtained by spraying a pre-polymer solution containing 1% by weight of poly dimethyl siloxane having a weight-average molecular weight of about 130,000 Da in 2,2,4-trimethyl pentane under similar conditions as applied in the previous Example in two runs onto a similar polypropylene substrate.

The resulting selectivity ($CO_2/N_2$) was only 1.3 which is the inherent selectivity for the polypropylene substrate itself, indicating the presence of a substantial number of uncoated substrate pores i.e. a porous PDMS membrane layer.

We claim:

1. A process for preparing non-porous membrane layers which comprises applying a solution comprising a hydrocarbonaceous solvent and a polymer having a weight-average molecular weight of at least 350,000 Da onto a porous substrate and allowing the solvent to evaporate, said polymer being selected from the group consisting of polysiloxanes, polysiazones, fluorosilicon elastomers and copolymers of siloxanes and polycarbonates.

2. The process according to claim 1 wherein the porous substrate contains pores having a diameter from 0.01 $\mu$m to 10 $\mu$m.

3. The process according to claim 1 wherein the polymer-containing solution is sprayed onto the substrate.

4. The process according to claim 1 wherein the concentration of the polymer in the solution is from 0.1 to 10% by weight.

5. The process according to claim 4 wherein the concentration of the polymer in solution is from 0.5 to 5% by weight.

6. The process according to claim 1 wherein an aliphatic hydrocarbonaceous solvent is employed.

7. The process according to claim 1 wherein the thickness of the non-porous membrane layer is from 0.05 to 100 $\mu$m.

8. The process according to claim 7 wherein the thickness of the non-porous membrane layer is from 0.1 to 10$\mu$m.

9. The process according to claim 1 wherein the non-porous membrane layer is coated with a non-porous selective membrane layer.

10. The process according to claim 9 wherein the coating is carried out by plasma polymerization.

11. A membrane containing a membrane layer prepared by the process of claim 1.

* * * * *